Oct. 26, 1926.    F. W. MANNING    1,604,650
PROCESS AND APPARATUS FOR CONTINUOUS COUNTER CURRENT PRESSURE FILTRATION
Filed Nov. 3, 1924    7 Sheets-Sheet 1
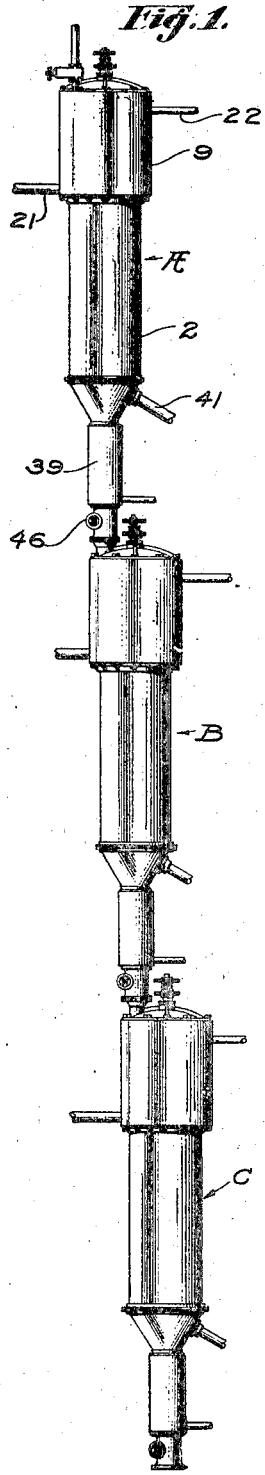
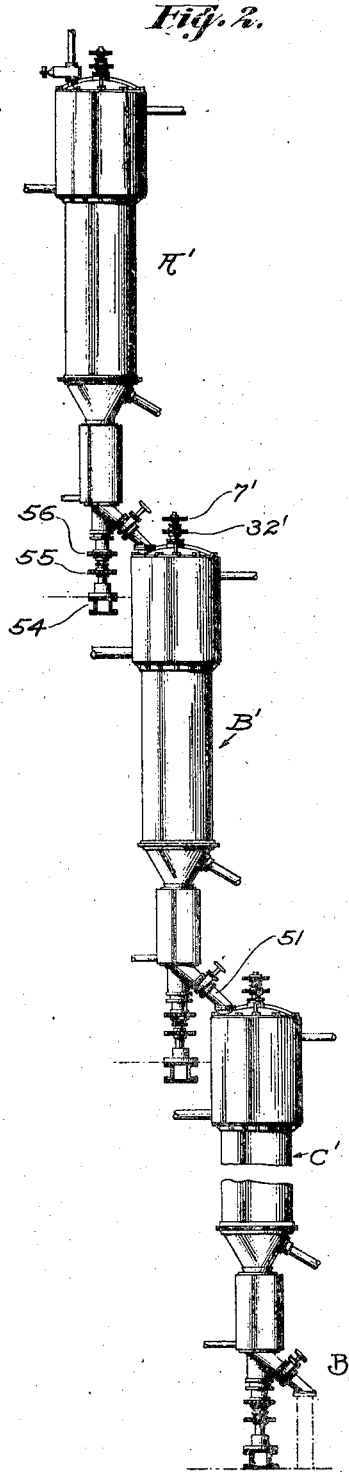
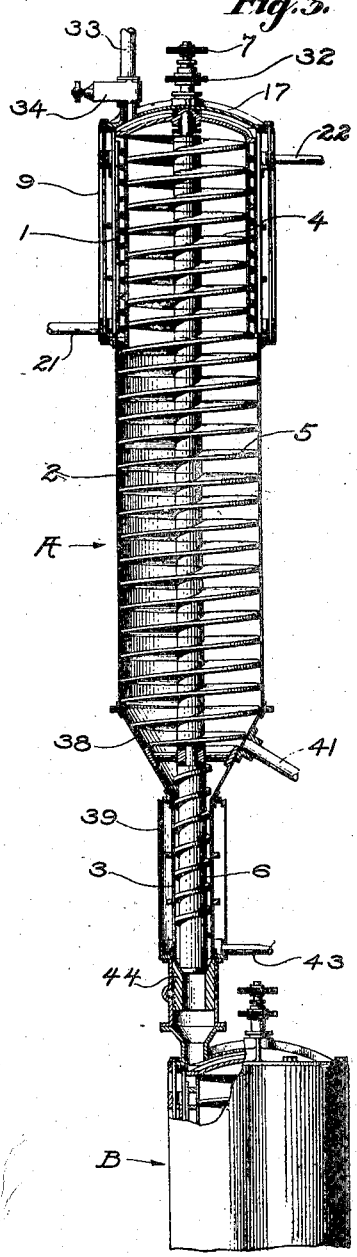
Inventor
FRED W. MANNING.
By Dewey, Strong, Townsend
and Lofters
Attorneys.

Oct. 26, 1926.                                                1,604,650
F. W. MANNING
PROCESS AND APPARATUS FOR CONTINUOUS COUNTER CURRENT PRESSURE FILTRATION
Filed Nov. 3, 1924            7 Sheets-Sheet 2

Inventor
FRED W. MANNING
By Dewey, Strong, Townsend and Loftus.
Attorneys.

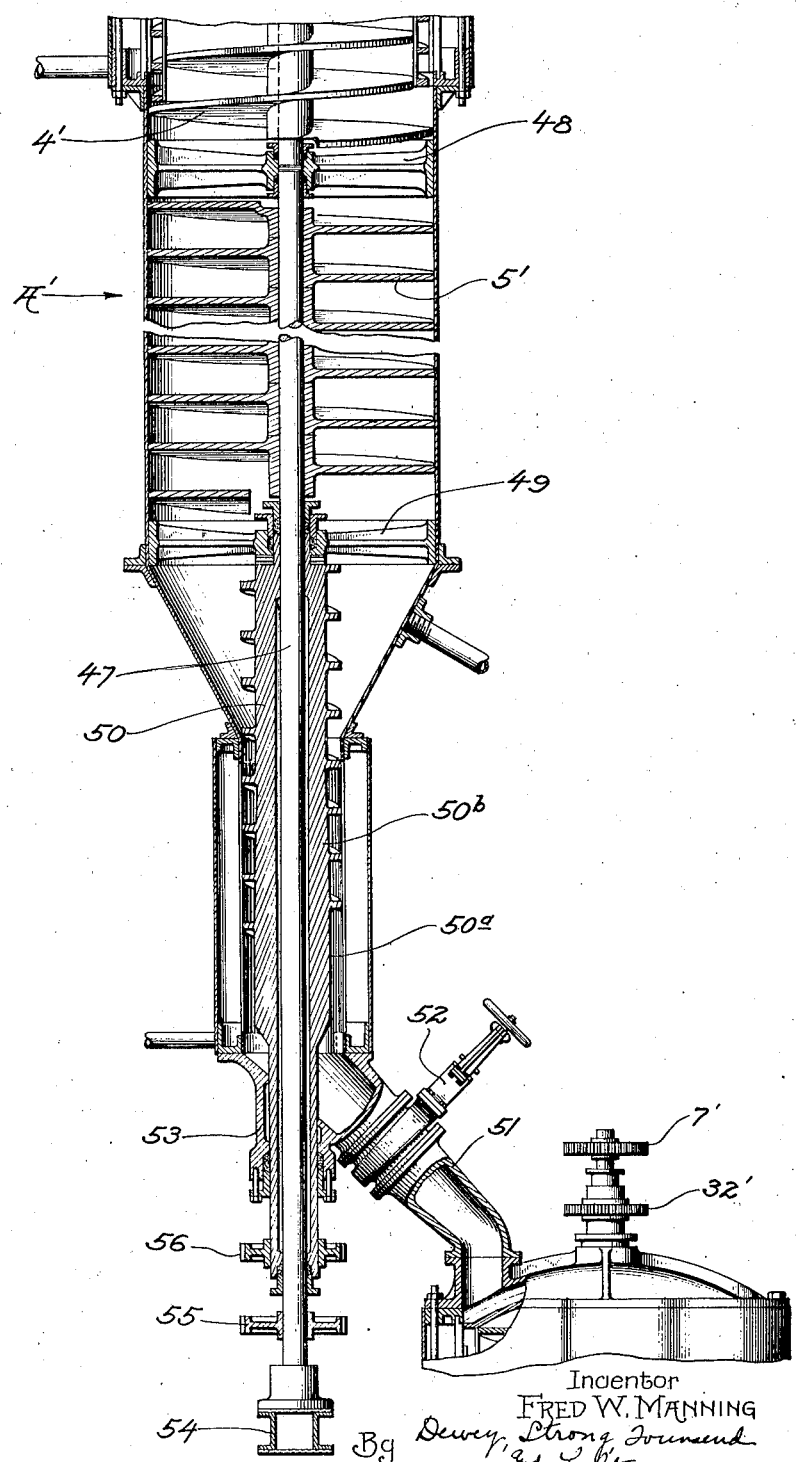

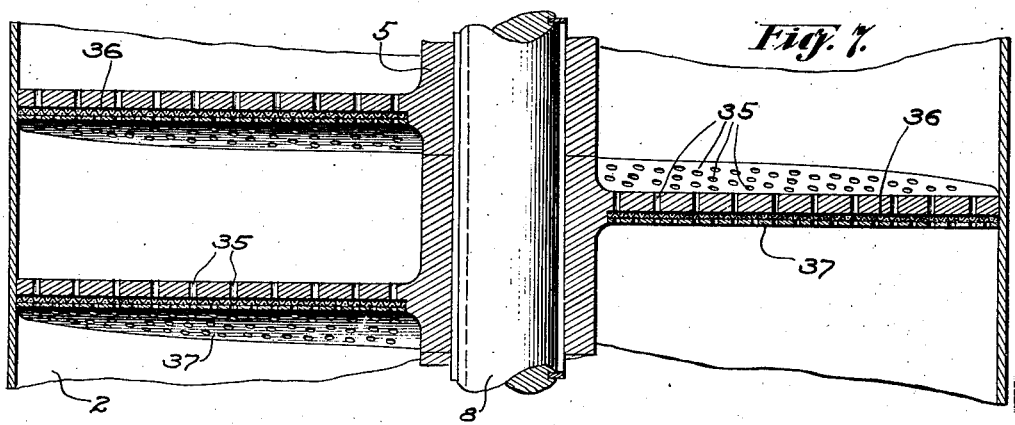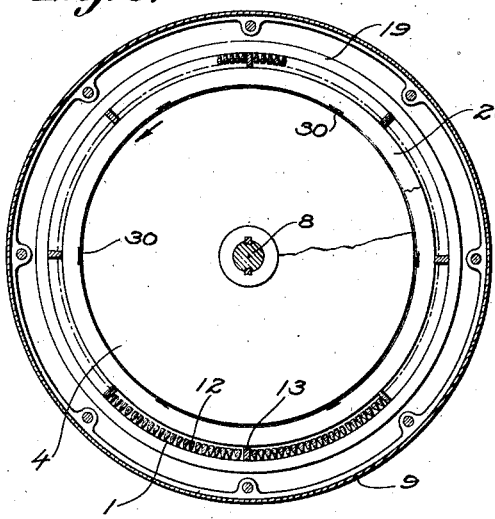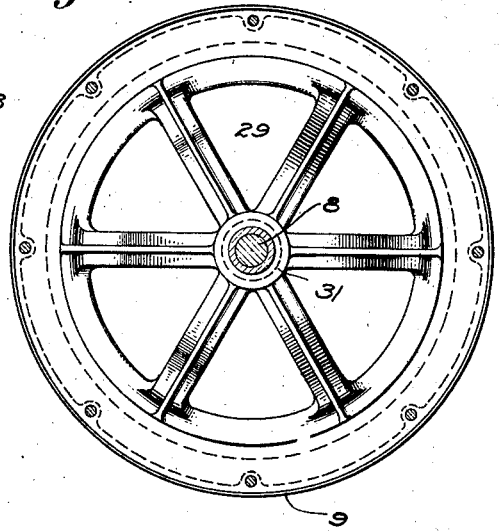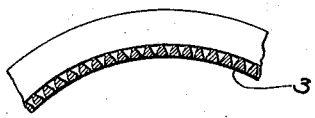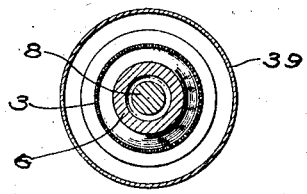

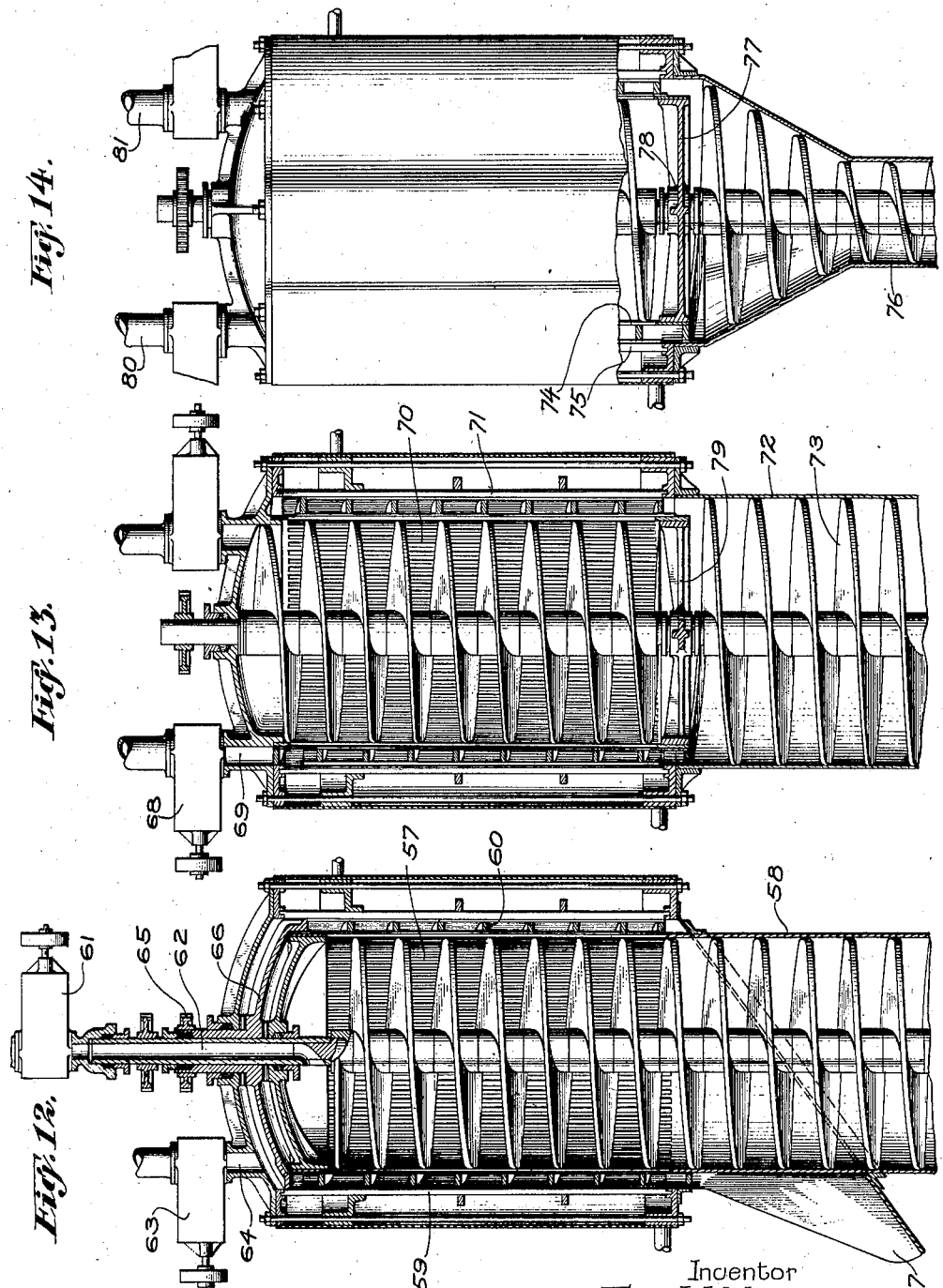

Oct. 26, 1926.

F. W. MANNING 1,604,650

PROCESS AND APPARATUS FOR CONTINUOUS COUNTER CURRENT PRESSURE FILTRATION

Filed Nov. 3, 1924    7 Sheets-Sheet 6

Inventor
FRED W. MANNING
By Dewey, Strong, Townsend
and Loftus
Attorneys.

Oct. 26, 1926.
F. W. MANNING
1,604,650
PROCESS AND APPARATUS FOR CONTINUOUS COUNTER CURRENT PRESSURE FILTRATION
Filed Nov. 3, 1924    7 Sheets-Sheet 7
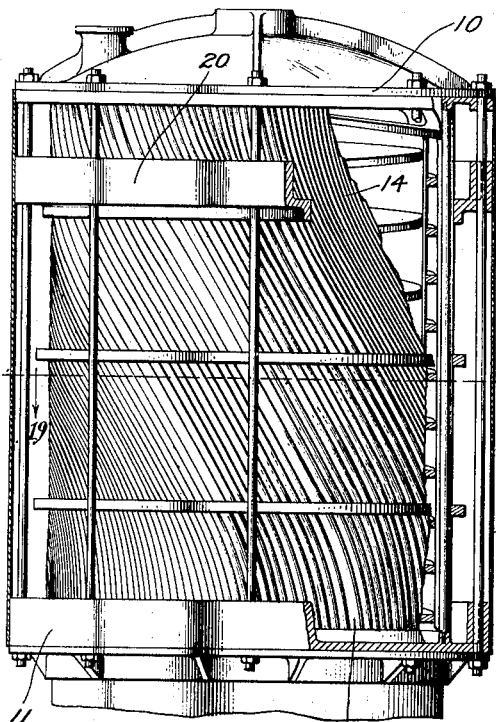
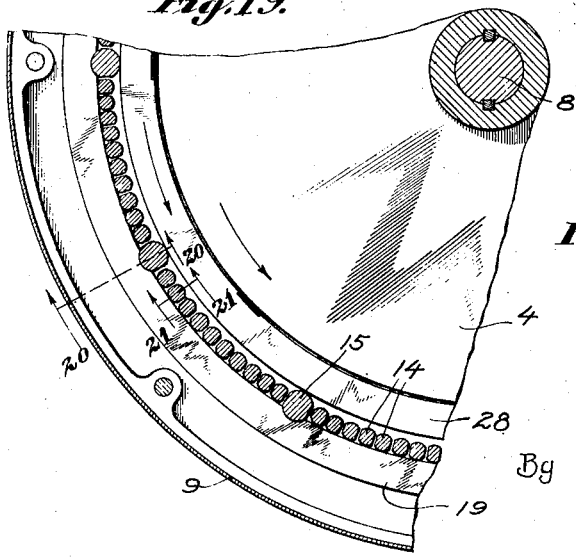
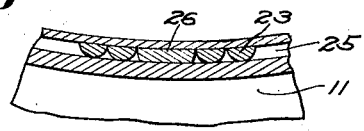
Inventor
FRED W. MANNING
By Dewey, Strong, Townsend and Loftus
Attorneys.

Patented Oct. 26, 1926.

1,604,650

UNITED STATES PATENT OFFICE.

FRED W. MANNING, OF BERKELEY, CALIFORNIA.

PROCESS AND APPARATUS FOR CONTINUOUS COUNTER CURRENT PRESSURE FILTRATION.

Application filed November 3, 1924. Serial No. 747,431.

This invention relates to improved treating and filtering processes and to apparatus for carrying the same into practice. Such processes are applicable to the purification of liquids such as sugar liquors, oils, etc. as by bleaching, decolorization, clarification, filtration, etc., to the separation or precipitation of solids from liquids, the extraction of values from solids, and to operations of a like nature. More specifically the invention relates particularly to continuous counter current treatment and continuous pressure filtration processes and apparatus wherein treating solids are introduced into a liquid near the filtering point thereof, and are moved counter-currently through the liquid to a point of separation, similar to the disclosure in my copending application Serial No. 689,178, filed January 28th, 1924, my present invention, however, comprising various improvements thereover. Attention is also directed to my following co-pending applications relating to this subject matter: Serial No. 20,155, filed April 2, 1925, and Serial No. 37,600, filed June 17, 1925.

In many arts of the above stated character it is desirable to contact a certain amount of fine or pulverulent material as intimately as possible with a liquid for the purpose of purifying or otherwise treating the liquid, or to aid in precipitation as the precipitating of gold from cyanide solution when the solution is brought into intimate contact with zinc dust, or to extract values from the materials, and for other purposes. To accomplish this the two are usually brought together in a mixing tank and the resultant sludge pumped through a pressure filter in which the solids gradually accumulate on the filter cloth as filter cake, the rate of filtration decreasing with the increasing thickness of the cake until the economical point in the filtering period has been reached.

If a clarifying agent such as kieselguhr, asbestos, paper pulp, cotton fibre, etc. is used to remove solid impurities, or a treating agent such as fuller's earth, bone char, etc. is used to remove coloring matter, or other impurities, either in colloidal form or in solution, then the rate of filtration decreases more rapidly due to the filter cloth and cake becoming clogged with impurities, and by the time the filtering period is finished, the full adsorptive capacity of the pulverulent material is far from having been utilized. After the solids have gathered on the filter cloth as filter cake, they are washed for the purpose of removing the soakage, or it may be for the purpose of leaching or extracting values, or for other purposes, but in any event the wash from start to finish becomes weaker and weaker or more ineffective until it is no longer economical to continue the washing. Furthermore the washing will not be uniform if there is any settling action of the solids. Other operations may precede or follow the washing, such as airing and steaming, and these, as in the case of washing, will not be uniform if the solids are heavy, and settle rapidly, and will carry less and less content of value until the cost of such operations exceed the values recovered by such operations and they are discontinued. Operators then remove the solids from the filter, repair or replace injured filter cloths and the cycle is repeated.

In order to avoid various objectionable features, such as the labor involved in operating pressure filters and filter presses, continuous suction filters are sometimes used but these have not been found satisfactory to handle sludges which are hot, volatile, difficult to filter, or whose solids require thorough washing or steaming, and for many other reasons which it is believed unnecessary to mention herein.

When large amounts of heavy adsorptive solids such as bone char, fuller's earth, etc., are to be used for purifying sugar solutions, oils, etc., it is desirable that they be used in a finely divided state, as for example 100 mesh or finer, as generally speaking the larger the surface exposed, the greater adsorptive value they have. But the quickly and uniformly contacting of large amounts of fine mesh adsorptive solids with such liquids and thereafter separating the two in the apparatus mentioned above, has been found to be impracticable because of many of the reasons given, particularly their rapid settling and clogging characteristics. Consequently, refiners have been compelled to resort to percolator filter tanks and coarse mesh purifying agents. These tanks are almost universally used where sugar solutions and oils are to be decolorized. Yet there are many objections to their use, such as the great lengths of time required for operations other than those producing a filtered liquid, the great amounts of treating agent required due to the necessity of using coarse instead of pulverulent material, the excessive amount of the washes, the loss of treating agent by attrition, fractional filtration, channeling, etc.

It is the primary object of my invention to provide an improved method and apparatus wherein a liquid to be treated for any of the purposes above mentioned may be mixed with fine or pulverulent material of any mesh, thereafter separated from such material and adsorbed impurities or resulting precipitates, the solids washed and reconditioned or any values extracted therefrom, and the carrying out of all these operations rapidly and continuously at any desired temperature and pressure.

Another object of my invention is the provision of a continuous pressure filtering process and apparatus for continuously building up a filter cake of minimum thickness to give clarity and continuously moving the same over a filter wall or medium between such wall and the filter liquid in such a manner that the filter cake forms a continuously moving body of solids through which the liquid passes to the filter wall.

Another object of the invention is the provision of the process and apparatus last mentioned and means cooperating therewith for operating on the filter liquid side of the filter cake for preventing the building up of solids thereon from the filter liquid, such solids being passed on through the apparatus and taking with them the impurities contained in the liquid, and thus preventing these impurities from ever reaching and clogging the filter cake.

A further object of my invention is the provision of the process and apparatus above described with means for continuously introducing solids into a liquid, passing the solids counter-currently through the liquid and thereafter compressing the same continuously to remove any of the liquid remaining therein; and furthermore to greatly decrease, by means of such counter current action, the amount of wash and other reconditioning agents usually necessary, and to maintain these at uniform and highly concentrated strength and at the same time accomplish the complete extraction or reconditioning of the solids.

Other objects of the invention, such as the complete utilization of the full adsorptive values of the treating agents by means of the counter current action of the filter liquid therethrough, the elimination of usual filter cloths and mixing tanks, great reduction of labor, etc. will become apparent as the description of the invention proceeds.

With the above and other objects in view, my invention consists in the features of construction and operation set forth in the following specification and illustrated in the accompanying drawings. In such drawings annexed hereto and forming a part of this specification I have shown certain specific embodiments of my invention, but it will be understood that the invention can be otherwise embodied and that the drawings are not to be construed as defining or limiting the scope of the invention, the claims appended to this specification being relied upon for that purpose.

One phase of my invention, like that of my said copending application, comprises a continuous filtering process having as its fundamental characteristic the establishing and continuous maintaining of a flow of liquid and treating solids counter-currently in direct contact with each other in an enclosed chamber, the fluid being forced under pressure through the solids in the chamber in one direction and the solids being moved therethrough by mechanical means or gravity in the opposite direction, heat being supplied to the apparatus by surrounding steam coils or other means, if desired. The scope of the invention in its broad sense is intended to include the coaction of solids and liquids in the novel manner of my process for various purposes such as for purification, clarification, separation, etc., and, with the intent of including all these functions within such scope, I have throughout this specification used the term "filtering". Thus the term "filtering" has been used broadly herein to mean the passing of liquid through solids for the purpose of extraction of values, precipitation of values, purifying purposes (the impurities being insoluble, in colloidal form or in solution), chemical re-action, catalytic action, etc. Also it should be understood that the term "treating" is used in reference to the solids in a broad sense to mean physical, chemical or other treating for any purpose with the exception of clarification. The term "filter liquid" is also used herein to designate the liquid before the same has been filtered and the term "filtrate" is used to designate the liquid after the same has been filtered.

As will be hereinafter more specifically described by reference to the accompanying drawings, the clarifying or treating solids are introduced into an enclosed liquid chamber through a specially designed valve which prevents loss of pressure from the chamber when such solids are introduced thereinto. The solids are thereupon at once thoroughly mixed with the filter liquid and usually the greater portion passed slowly and continuously therethrough in a direction counter to the movement of the liquid. A portion of the solids is however formed into a filter cake of sufficient thickness to give clarity to the filtrate and is continuously moved by mechanical means over a filtering or retaining wall after which it becomes disintegrated and unites in the general counter current movement of the solids. Thus the liquid to be treated is thoroughly purified or otherwise acted upon by the solids before reaching the filter medium where it is filtered through a continuously moving filter cake continuously built up from the introduced solids.

When the disintegrated filter cake and other solids passing counter-currently through the filter liquid reach the end of the counter current chamber they have exerted their utmost power on the liquid to be treated, or, the liquid utilized its full value on the solids to be treated as the case may be. These solids thereupon enter a compression chamber where the solids are again collected or compressed by gravity, filtering pressure or mechanical compression, and then passed on into the next section of the apparatus. The solids thereafter again pass through a like chamber wherein they are washed to remove any soluble content. After being again collected or compressed the solids may be again passed into a like third chamber wherein the wash soakage can be removed and the solids reconditioned in any of the various manners hereinafter described. If desired, the solids can be passed through a fourth chamber to remove any remaining portion of the revivifying agent.

The invention will now be more specifically described by reference to the accompanying drawing wherein—

Fig. 1 is a side elevation of one form of apparatus for practicing my invention.

Fig. 2 is a modification thereof.

Fig. 3 is a sectional elevation of one unit of the apparatus shown in Fig. 1.

Fig. 6 is an enlarged sectional elevation of the lower end of one of the units shown in Fig. 2.

Fig. 7 is a fragmentary enlarged elevation in vertical section through the agitating and counter current spirals shown in Fig. 3.

Fig. 8 is a horizontal sectional view taken on line 8—8 of Fig. 4.

Fig. 9 is a horizontal sectional view taken on line 9—9 of Fig. 4.

Fig. 10 is a horizontal sectional view taken on line 10—10 of Fig. 5.

Fig. 11 is a fragmentary enlarged view of the filter cage portion of Fig. 10.

Fig. 12 is a view similar to Fig. 4 but showing a modified form of the invention.

Fig. 13 is a like view but showing a further modification thereof.

Fig. 14 is a view in side elevation and partially in vertical section showing another modified form of unit.

Fig. 18 is an elevation of a filter cage having spirally arranged filter bars.

Fig. 19 is an enlarged fragmentary sectional view taken on line 19—19 of Fig. 18.

Fig. 20 is an enlarged fragmentary elevation of Fig. 18, showing how the spacer bars are secured at their ends.

Fig. 21 is a view similar to Fig. 20 but showing how the smaller filter bars are secured in like manner.

Figs. 22, 23 and 24 are detail sectional views taken respectively on lines 22—22, 23—23, 24—24 of Figs. 20 and 21.

The apparatus shown in Fig. 1 for carrying out my invention comprises three sections A, B and C, each section being an enclosed chamber as shown in Fig. 3. The exterior of sections A, B and C is the same and the interior of sections B and C is the same as that of section A, shown in Fig. 3.

Except for certain modifications hereinafter described, the sections A′ B′ and C′ shown in Fig. 2 are the same as those shown in Fig. 1. The exterior of sections A′ B′ and C′ is the same and the interior of sections B′ and C′ is the same as that of section A′, shown in Figs. 4 and 6.

The process of my invention whether carried out by the apparatus shown in Fig. 1 or Fig. 2 is substantially the same, these two forms of the invention differing principally only in structural details.

Figure 5:
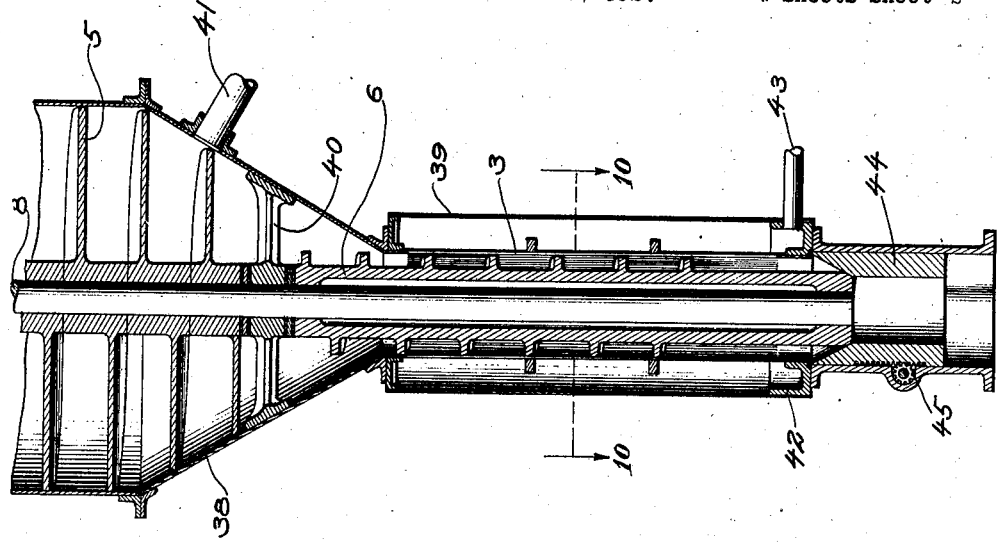
Fig. 5 is an enlarged sectional elevation of the lower end of such unit.
Figure 4:
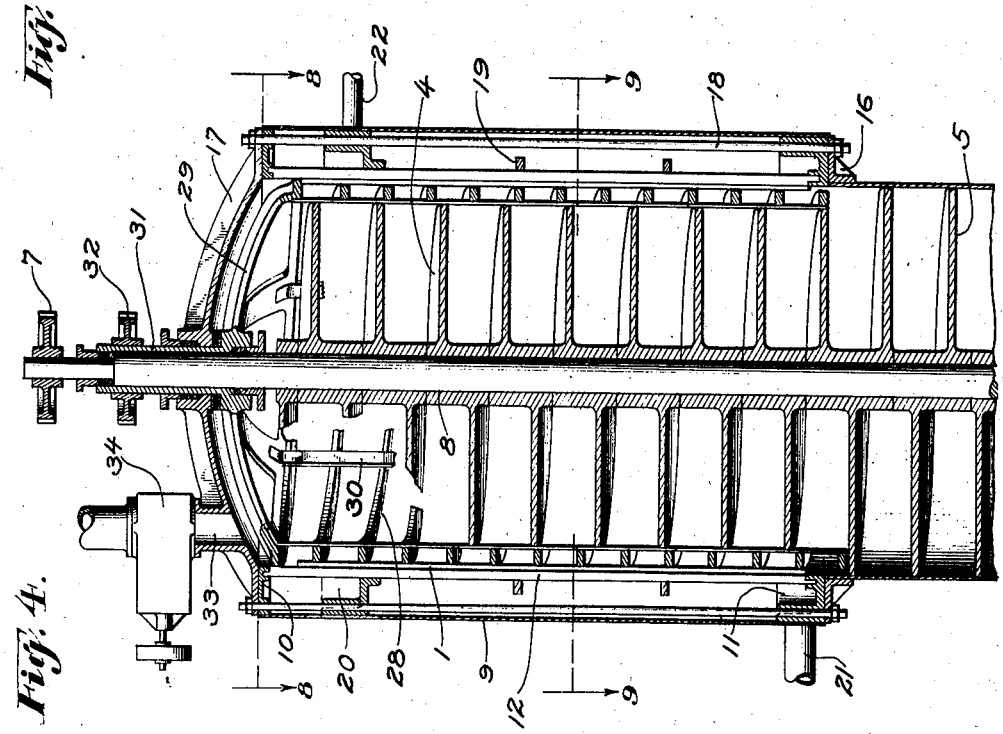
Fig. 4 is an enlarged sectional elevation of the upper end of the unit shown in Fig. 3.

The form of the invention shown in Figs. 1, 3, 4, 5 and 7 to 11 inclusive will first be described. Each unit A, B and C comprises a section having at its top a mixing chamber enclosed by a cylindrical filter cage 1, an intermediate counter current chamber enclosed by a cylindrical wall 2, and a bottom compression chamber enclosed by a smaller cylindrical filter cage 3. Three spiral members 4, 5 and 6 are respectively mounted coaxially within these chambers and are all adapted to be rotated by a gear 7. As illustrated, the gear 7 is mounted on a shaft 8 to which the spiral flights are secured. The flights can be made solid as the screw 6 (Fig. 5) or in separate elements and built up as shown for spirals 4 and 5 (Fig. 4). The spiral 4 is the agitating member, the spiral 5 the counter current member and the screw 6 the compression member, the function of each of which will hereinafter appear.

The filter cage 1 of each section is surrounded with a splash plate wall 9. This cage comprises an annular top flange 10 and filtrate launder 11 into which are non-rotatably seated the ends of filter bars 12 and 13. The bars can either be straight with straight sides as the bars 12 and 13, shown in Figs. 4 and 9, or arranged spirally with rounded sides as the bars or rods 14 and 15, shown in Figs. 18 and 19. The smaller bars 12 and 14 are termed the filter bars and the larger bars 13 and 15 are termed the spacer bars. The filter bars are arranged in series with a spacer bar between each two adjacent series and all of the bars are relatively spaced to provide a filter wall. The counter current chamber flange 16, the filtrate launder 11, the top flange 10 and the cover 17 are shown all bolted together by rods 18. The intermediate portion of the filter cage or wall is reinforced by bands 19 enclosing the outside thereof. The launder 11 receives the clear filtrate passing through the filter cage and a second and upper adjustable launder 20 receives the cloudy filtrate as hereinafter described. The filtrate can be drained from the launders or troughs 11 and 20 by pipes 21 and 22 leading therefrom.

The filter bars are spaced a suitable distance apart, this spacing usually varying between .005 and .01 inch on the inside and a greater distance on the outside so as to prevent any possibility of clogging or packing between the bars. The filter cage, comprising the parallel bars 12 and 13 or 14 and 15 and the top flange 10 and launders 11 and 20, may be made in vertical halves, as in the ordinary continuous screw presses for fibrous materials, so that one half may be swung open for inside inspection, but this probably will not be necessary as there are no filter cloths to wear out and instead of using the great pressures of the ordinary screw presses, the pressure maintained will seldom be in excess of 100 lbs. or 150 lbs. per square inch, and furthermore a manhole in the top cover can be provided for inspection when necessary.

The manner of securing the filter and spacer bars rigidly in place is shown in connection with the spirally arranged bars in Figs. 18 to 24. The ends 23 of the filter bars are squared off and seated non-rotatably in slots 24 and 25 in the top flange 10 and launder 11. The ends 26 of the spacer bars are secured in like manner. The bars, whether arranged straight or spirally, are preferably secured in this manner. A splash plate wall 27 is provided around the spirally arranged filter cage shown in Fig. 18.

Within the filter cage and directly adjacent the spacing bars 13 and 15, is a filter-cake feeding member comprising a spiral 28 supported and rotated by the spider 29 within the cover 17. A plurality of tie bars or straps 30 (Fig. 9) having sharp cutting edges are secured to the inner edges of the spiral flights for giving support to the flights and aiding in the process hereinafter described. The periphery of the agitating spiral 4 is directly adjacent these straps 30. The hub 31 of the rotary spider 29 extends through the cover 17 and is driven by a gear 32 thereon.

A port 33 to which is attached a feeding valve 34, is provided in the cover 17 above the spider 29 and feeding spiral 28. The purpose of this port and valve is to supply the treating solids to the mixing chamber in the manner hereinafter described.

The construction of the flights of the agitating and counter current spirals 4 and 5 is illustrated in detail in Fig. 7. These flights are perforated at 35 and the advancing side of the flights is covered with a filter medium 36 which may be a metal screen of fairly coarse mesh. The filter cloth or screen is protected by a thin perforated wearing plate 37 thereover.

The lower end of the counter current chamber 2 is formed into a conical chamber 38 and leads into the compression chamber enclosed by filter cage 3 and surrounded with a splash wall 39. This compression chamber is preferably formed of a solid cylindrical pipe slotted longitudinally to provide suitable filter openings therein as shown in Figs. 10 and 11, although in order to obtain a clear filtrate the same may be formed of filter and spacer bars like the bars 12 and 13 or 14 and 15 above described, the screw 6 in such case being spaced from the filter bars 12 or 14 by the spacing bars 13 or 15. The compression chamber also may be surrounded with a moving body of filtering solids similar to the arrangement shown in Fig. 12 for the filter cage.

A bearing 40 is provided in the conical chamber 38 between the counter current and compression spirals 5 and 6 for the shaft 8 which carries these spirals. An inlet port 41 for the filter liquid is also provided in this chamber adjacent the bearing. To the lower portion of the compression chamber is attached a launder 42 to receive the filtrate from the compression chamber which may be discharged through an outlet pipe 43. A valve 44 may be adjusted by means of the rack and pinion engagement 45 operated by handwheel 46, to regulate the compactness of the solids discharged into section B.

Instead of driving the agitating, counter current and compression spirals from a single shaft 8 as just described, these spirals can be independently operated, if desired, in the manner shown in Figs. 2 and 6. In this arrangement the agitating spiral 4' is substantially the same as the spiral 4 and is driven in the same manner from a gear 7'. The counter current spiral 5' is mounted on a shaft 47 between bearings 48 and 49, the shaft extending downwardly through the compression screw 50. A discharge connection 51 carrying a valve 52 and a bearing 53 connects the different sections together and conveys the solids from the compression chamber to the next section. The shaft 47 extends below the end of the compression screw and is rotatably supported by a foot-step bearing on a support 54. The shaft 47 and the compression screw 50 are driven by gears 55 and 56 thereon.

The thrust of the compression screw 50 will be taken by the lower spider bearing 49. The weight of the counter current spiral 5' will more than offset any thrust due to its rotation and will be taken by the foot-step bearing at 54. The weight of the agitating spiral 4' will also offset any thrust due to its regulating the depth of the cake solids, as hereinafter described, and will be taken care of either by the upper spider bearing 48 or else its weight will be transmitted through the counter current shaft to the foot-step bearing. The thrust of the feeding spiral will be taken care of by the top cover as shown in Fig. 4. In this arrangement the screws can be driven independently and at any speeds desired.

My process as carried out by the mechanism illustrated in Figs. 1, 3, 4, 5 and 7 to 11 inclusive, will now be described, it being understood, however, that the process is substantially the same when carried out by the mechanism as modified in Figs. 2 and 6.

The liquid to be filtered is forced under pressure through the pipe 41 at the lower end of the enclosed section A in such a manner as to maintain a slowly and upwardly moving column of liquid through the chamber to the mixing chamber enclosed by the filter cage 1 thereof. The treating solids in a dry or substantially dry state are introduced into the mixing chamber through the port 33, by means of the valve 34. A portion of these solids gather on the filter wall 12 and are formed into a cylindrical filter cake and carried downwardly by the feeding screw 28 which limits the depth of the filter cake to just sufficient thickness to give clarity to the filtrate without retarding its filtering rate. However, usually the greater portion of the solids is carried downwardly by the agitating spiral 4. It should be understood that the agitating spiral 4 and feeding spiral 28 are continuously and slowly rotated in directions to slowly move the solids downward counter-currently to the upward movement of the filter liquid, the agitating spiral rotating more rapidly than the feeding spiral. The rate of movement of the solids can be regulated both by varying the pitch of the spirals and by varying the speed of rotation thereof.

The top cover 17 takes the thrust of the feeding spiral, and the spider bearing 40, at the conical entrance to the compression chamber, takes the weight of the agitating and counter current spirals and the thrust of the compression screw, usually the thrust of the latter about equalizing the weight of the agitating and counter current spirals. The three spirals or screws usually rotate more rapidly than the feeding spiral and the speed is determined by the requirements of the counter current screw. The rate of movement of the solids may also be regulated by varying the pitch of the different screws.

The solids carried downward by the agitating spiral are thoroughly mixed with the liquid and, together with any small amount of impurities gathered from the liquid in the mixing chamber, are slowly moved downwardly counter-currently of the liquid movement. The solids carried downward by the feeding spiral 28 are formed into a uniform continuous filter cake entirely covering and directly adjacent to the filter wall 12 and between such wall and the filter liquid within the mixing chamber. The filter cake is therefore continuously built up in the upper end of the chamber and continuously moved downward over the filter wall by means of screw 28. This screw is in contact with the upper end of the filter wall in order to facilitate starting the newly built up cake downward, but below is spaced from contact with the filter wall by means of the spacer bars 13 (Fig. 9), such relations preventing the clouding of the filtrate by any disturbance of the solids immediately next the filter wall. The spacer bars 13 also prevent the filter cake from rotating with the agitating and feeding spirals. The filtrate passing through the top of the filter wall where the filter cake is formed will be somewhat cloudy. Such filtrate is caught in the upper or cloudy filtrate launder 20, which may be shifted upwardly or downwardly as desired, and may be returned to the filter chamber either directly or through the feeding valve 34. However, the greater portion of the filtrate will be clear and is caught in the lower clear filtrate launder 11.

During the filtering operation the solids in the mixing chamber would normally tend to build up on the filter cake and thereby clog the filter medium and result in a lowered filtering rate. Such action is prevented by the flights of the agitating spiral 4, which cooperate with the inner edge of the feeding spiral 28, and particularly with the front sharp edges of the strips 30, to continuously slice or trim off the inner surface of the cake and carry the same downwardly with the major portion of the solids.

At the lower end of the mixing chamber, the filter cake is continuously moved off the filter wall 12 and into the counter current portion 2 of the chamber. The continuously rotating counter current spiral breaks up the cake and carries the same downwardly through the filter liquid along with the solids brought down by the agitating spiral 4. To accomplish this movement of the solids against the advancing liquid body, the agitating and counter current spirals are made of perforated metal and provided with coarse metal filtering fabrics and wearing plates on their advancing side, as has been heretofore described. The solids and disintegrated filter cake move through the counter current chamber and treat the incoming liquid, and when impurities exist in the liquid these are almost entirely eliminated before the liquid reaches the mixing chamber so that the filter wall can never become clogged with impurities. The solids, after passing through the chamber and fully serving their intended purpose, finally reach the end of the counter current chamber and the entrance to the compression chamber within the cylindrical filter cage 3.

The rotating screw 6 receives and forces the spent solids downwardly through the compression chamber wherein the filter liquid is filtered outwardly through the filter wall 3. From the compression chamber the solids pass directly into the top of the next section. Ordinarily there would be no object in obtaining a clear filtrate from the compression chamber as it would have been in contact with only exhausted solids and would have to be returned to the counter current chamber through pipe 41. The collection of the solids in the compression chamber may be due to gravity, the movement of the counter current and compression screws and the filtering of the liquid under the liquid pressure exerted in the counter current chamber. If the solids are of a slimy nature and tend to turn with the screw a granular inert solid may be introduced to overcome this difficulty. The compactness of the cake solids may be due simply to the solids gathering on the filtering medium under the pressure exerted throughout the apparatus but it may be regulated by adjustment of the annular valve 44 and also by the use of a tapered compression screw as illustrated in Fig. 6 wherein the lower plain portion 50$^a$ of the screw shaft 50 is cylindrical while the shaft of the screw portion 50$^b$ is tapered outward downwardly. If desired, the valve and the valve casing may be eliminated entirely and the compression chamber connected directly to the flange of the next section in which case the annular ring of solids around the plain portion of the compression shaft between the end of the screw and the end of the shaft will prevent passage of liquid or gas such as steam from one section to another.

From the compression chamber of the unit A the solids enter the next section B of the apparatus where they progress on through in the same manner as in the first section. In the second and following sections of the apparatus the solids may be treated in any desired manner. If the solids are, say, bone char, fuller's earth, keiselguhr, or other purifying agents and have been used in the first section of the apparatus for purifying such liquids as sugar solutions, oil, etc., then in the second section the sugar or oil soakage may be washed out by means of hot water, naphtha, or other suitable washing fluid.

In the third section the wash soakage may be removed by air or steam or other agent, or the solids may be revivified by means of benzol, acetone, alcohol, ammonia, acid or alkali solutions, soap solution, saturated or superheated steam, heated gases, or any other agent that may be used as a solvent for coloring matter, or other impurities, and for revivifying purposes, it being understood that any of these agents or any combination of them may be used for washing the mother liquid from the solids, for the extraction of values from the solids and for revivification purposes. If necessary a fourth section or chamber may be added to remove from the solids any portion of the revivifying agent that still remains in the solids.

If steam or hot air or other hot gases is used in the last section of the apparatus to remove any soakage remaining in the solids from the preceding section, or for revivifying or other reconditioning purposes, no compression chamber will probably be required as the solids will be comparatively dry on reaching the bottom of the counter current chamber and may be discharged at once through a discharging valve similar in construction to the feeding valve.

With certain kinds of powdered purifying agents, especially those used to remove dissolved impurities, it is very difficult to obtain clear filtrates without the addition of a clarifying agent such as kieselguhr, asbestos, paper pulp, sand, etc. The fine particles of some decolorizing carbons will even pass through filter paper, and at other times the treating agent will not hold back the suspended impurities. In such cases, I either mix the clarifying agent with the treating agent before introducing it into the liquid, or feed it independently into the liquid through the same feeding valve (Fig. 4), or through an independent feeding valve (Fig. 13). I may also mix the clarifying agent with the sludge if the solids to be filtered out already exist in the liquid, or, I may arrange for a continuous precoating of the filter medium, the precoating being discharged either into the counter current or compression chambers (Figs. 13 and 14), or outside of the apparatus (Fig. 12).

If the solids already exist in the liquid and no precoating is desired, the counter current chamber may be eliminated and the solids discharged directly from the filtering chamber into the compression chamber (Fig. 14). If the character of the treating solids is such as to cause a slow rate of filtration, I may add such solids as kieselguhr, asbestos, paper pulp, sand, etc., and when used for the purposes of increasing the rate of filtration they will be considered as spacing agents and may or may not at the same time serve as clarifying agents.

In Fig. 12, I have shown an arrangement wherein a clarifying agent or agent used for other purposes may be kept entirely separate from a treating agent and at the same time moved forward continuously at sufficient speed to prevent any clogging of the clarifying agent with resultant lowered filtering rate. For such a purpose the upper end 57 of the tank 58 may be slotted to form a filter wall or cage similar to the compression chamber 3 (Figs. 10 and 11), or it may be perforated and a filter cloth wrapped around the inside or a wire winding around the outside, or a parallel bar arrangement may be used. If a wire winding is used the windings will be suitably spaced and the cake solids moved forward or downward along the windings in a helical direction by means of straight arms attached to connection 66, in which case there will be no spacer bars as the bars 13 in Fig. 4. A filter wall or cage 59 of filter bars like 12—13 of Figs. 4 and 9 surrounds the wall 57 with the feeding screw 60 located therebetween. The treating solids enter the mixing chamber from a central feeding valve 61 through a bore 62 in the spiral shaft and the clarifying solids enter between the walls 57 and 59 from a feeding valve 63 through a port 64 on one side of the top cover. The clarifying agent may be any suitable material such as kieselguhr, paper pulp, sand, asbestos, etc.

The feeding screw 60 for the clarifying agent is driven from a gear 65 above, as shown, but the connection 66 between the screw and shaft is solid and not the spider arrangement shown in Fig. 8. The clarifying agent enters through the port 64 and is received by the feeding screw 64, formed into a cylindrical filter cake between the two filter walls 57 and 59 and moved continuously downward between such walls as the screw rotates. A chute 67 is provided for carrying away the used filtering agent as it leaves the bottom of the filter walls. If it is desired that the filtrate from the inner filter wall contain as little insoluble substance as possible, spacing bars, as the bars 13 shown in Fig. 9, may be used, in which case the treating solids will be moved forward without the edge of the agitating spiral coming too close to the filter wall.

In some cases the desired action between the solids and the liquid may be accomplished without the introduction of solids into the liquid and therefore without any central feeding valve leading into the tank. Such process is carried out simply by feeding the solids down between the two filter walls and causing the liquid to filter therethrough. This process may be used for treating, clarifying, or other purposes. If, in such a case, the liquid to be filtered contains only a small amount of impurities or other insoluble matter and the moving wall of solids and inner filter medium are such that the insoluble contents will pass through the latter and will be retained by the former, then the counter current and compression chambers may be dispensed with and the lower end of the agitating screw shaft supported on a foot-step bearing, bolted to either the inner or outer side of an imperforate bottom plate of the inner filter cage, similar to 78 and 77 in Fig. 14, in which case the solids would be discharged by means of a chute similar to 67 in Fig. 12.

In Fig. 13 the clarifying solids enter by a valve 68 through a port 69 and are moved forward by the feeding screw between filter walls 70 and 71 and until they enter the counter current chamber 72 to be passed on through by the counter current spiral 73, as in Fig. 2.

In Fig. 14 I have shown an arrangement wherein the treating or clarifying solids moved downward between two filter walls or mediums 74 and 75 may be discharged directly into the compression chamber 76. If it is desirable that the solids moving between the two filter walls do not mix with the liquid, then a bottom imperforate plate 77 with a center bearing 78 may take the place of the spider arrangement 79 shown in Fig. 13. But in this case the solids moving between the two filter walls must retain the insoluble contents of the liquid, all of which must be allowed to pass through the inner filter wall. Such an arrangement is usually only possible when the percentage of insoluble content of the liquid is small. In this construction the solids and liquids may be fed to the apparatus through ports 80 and 81.

As has been stated above, the filter bars can be arranged straight, as the bars 12 and 13 (Figs. 4 and 9), or spirally, as the bars 14 and 15 (Fig. 18). Since the spacer bars 13 and 15 act as guides for the filter cake, the cake moves downward in the direction of such bars, thus, with spirally arranged bars the filter cake would move downwardly in a spiral path. Such movement cooperates with the spiral action of the feeding and agitating screws which are continually operating within and on the filter cake. For this reason the spiral arrangement of the filter wall is believed to be particularly desirable in connection with the feeding and agitating spirals or screws.

Figure 15:
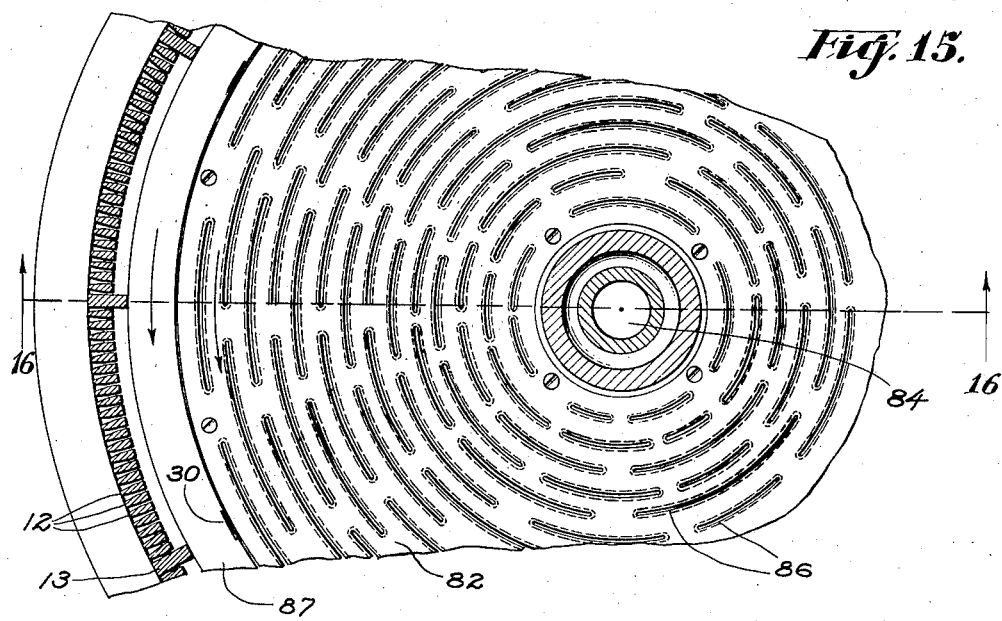
Fig. 15 is an enlarged fragmentary sectional plan view through a unit showing a modified form of spiral therein.
Figure 16:
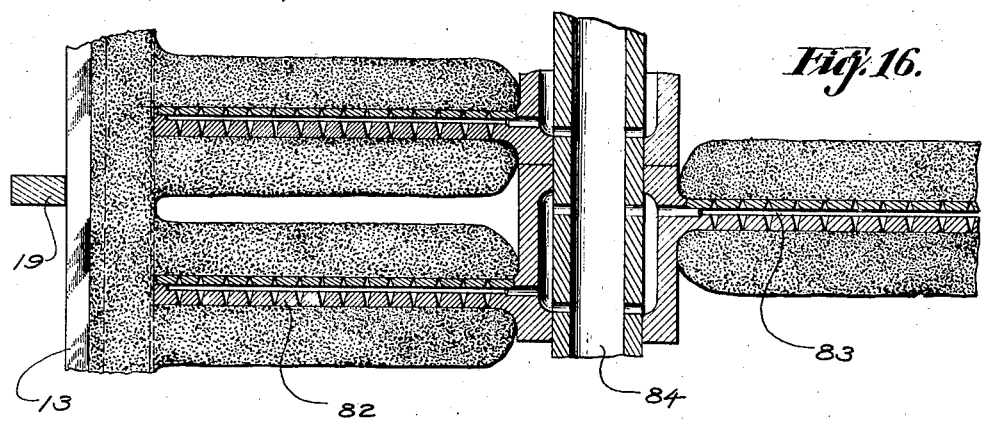
Fig. 16 is a fragmentary vertical sectional view taken on line 16—16 of Fig. 15.
Figure 17:
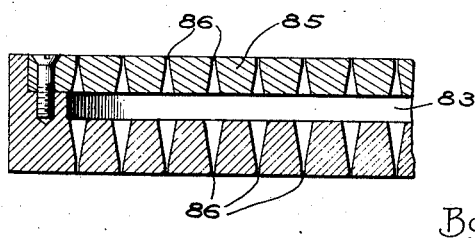
Fig. 17 is a fragmentary enlarged section view through a spiral flight on line 16—16 of Fig. 15.

In Figs. 15, 16 and 17 I have shown a further modification of my invention to give a greatly increased filter area, wherein the filtering may take place, not only through the cylindrical filter wall or cage, but also through the flights of the spirals, or, if desired, the filtering may be carried on through the spiral flights alone in a plain tank having no cylindrical filter cage. In this form of my invention, as illustrated, the spiral flights 82 are each provided with a drainage opening 83 in communication with a bore 84 extending axially through the screw shaft. The two sides of each flight, one of which consists of a removable plate 85 are slotted concentrically at 86 to provide filter openings in communication with the opening 83. The cylindrical filter wall or cage illustrated is made up of filter and spacer bars 12 and 13, as in Fig. 9.

In this form of the invention, the treating solids are fed into the upper end of a section of my apparatus in the manner heretofore described in reference to Figs. 1, 2, 3, etc. and the filter liquid is forced slowly therethrough from the opposite end of the chamber. The screw 82 rotates slowly in a direction to carry the solids downward counter-currently to the liquid. The solids on the cylindrical filter medium and on the spiral filter medium must therefore be moved forward by the feeding screw 87 and the filtering screw 82 at the same rate in order that the solids on both filter mediums form one continuous cake of solids.

As shown in Fig. 16, the filter cake builds up about the spacer bars 13 in a manner preventing the rotations of the filter cake with the feeding screw 87. The sides of the filtering flights 82 are smooth and so accurately formed that they slide through the spiral filter cake, which is united to the cylindrical filter cake, as the screw rotates. It will therefore be obvious that rotation of the feeding and filtering screws within the non-rotating cake moves the cake downwardly in the chamber as a unit. For many purposes the feeding screw 87 will not be necessary and the flights of the filtering spiral may be extended to the spacer bars 13. The operation is continuous, the solids being continuously fed to the chamber and forming the filter cake on the filter mediums as fast as the same moves downwardly and off the filter mediums. Should it be desirable at any time to thoroughly clean the chamber, such operation can be accomplished by speeding up the rotation of the filter screw, such action throwing the cake solids outwardly by centrifugal force and moving it downward by means of the feeding screw.

In using the filter screw in a plain chamber, the filtering operation may be semi-continuous. The treating solids and filter liquid are fed into the tank from the opposite ends thereof in the usual manner as the screw slowly rotates. The solids are moved downwardly through the liquid and gradually build up on the flights of the screw. In this process the screw flights do not move through the filter cake but the cake rotates in the chamber with the screw. Filtering takes place through such flights until the thickness of the cake increases and the rate of filtration decreases to a point where the operation cannot be carried further economically. The screw rotation is then speeded up in a manner to throw off the built up cake solids by centrifugal force and move the same downwardly to the bottom of the chamber and therefrom to the outside of the chamber.

Having thus described my invention what I claim and desire to secure by Letters Patent is—

1. A treating and filtering process consisting of introducing two agents into a chamber containing a liquid, first treating the liquid with only one of the said agents in one portion of the said chamber, and thereafter filtering the treated liquid through only the other of the said agents in another portion of the said chamber.

2. A continuous treating and filtering process consisting of continuously introducing a clarifying agent and a treating agent into a chamber containing a liquid, first continuously treating the liquid with only the treating agent in one portion of the said chamber and thereafter continuously clarifying the treated liquid by passing the same through only the clarifying agent in another portion of the said chamber.

3. A continuous treating and filtering process consisting of continuously introducing a clarifying agent and a treating agent into a chamber containing a liquid, continuously treating the liquid by passing the treating agent through the liquid in counter-direction to the movement of the liquid, forming the clarifying agent into a filter cake and moving the same over a filter wall, and clarifying the treated liquid by passing it through the said filter cake and wall.

4. A filtering process consisting of building up a filter cake within an enclosed chamber, of moving the same bodily over a permanent filter wall between such wall and the filter liquid while such cake is directly in contact with the wall, and of building up further filter cake and moving the same over the filter wall to take the place of and simultaneously with the movement of the first filter cake off the filter wall, the filter cake forming a moving body of solids through which the liquid passes to the filter wall.

5. A continuous filtering process consisting of continuously building up a filter cake within an enclosed chamber, and continuously moving the same bodily over a permanent filter medium between such wall and the filter liquid while such cake is directly in contact with the wall, the filter cake forming a continuously moving body of solids through which the liquid passes.

6. A continuous filtering process consisting of building up a filter cake of uniform thickness within an enclosed chamber and mechanically supporting and continuously moving the same bodily over a permanent filter wall between such wall and the filter liquid while such cake is directly in contact with the wall, the filter cake forming a continuously moving body of solids through which the liquid passes to the filter wall.

7. A continuous filtering process consisting of continuously building up a filter cake within an enclosed chamber, of continuously moving the same bodily over a permanent filter wall between such wall and the filter liquid while such cake is directly in contact with the wall, and continuously trimming the liquid side of the cake a predetermined amount to remove material deposited thereon from the liquid, the filter cake forming a continuously moving body of solids through which the liquid passes to the filter wall.

8. A continuous filtering process consisting of continuously building up a filter cake within an enclosed chamber, of continuously moving the same bodily over a permanent filter wall between such wall and the filter liquid while such cake is directly in contact with the wall, and of operating on the liquid side of the cake to prevent the building up of solids thereon and to carry such solids away from the cake, the filter cake forming a continuously moving body of solids through which the liquid passes to the filter wall.

9. A filtering process consisting of building up a filter cake within an enclosed chamber, of moving the same over a permanent filter wall while such cake is directly in contact with the wall, of building up further filter cake at the end of the wall and moving the same over the filter wall to take the place of and simultaneously with the movement of the first filter cake off the filter wall, and trimming the liquid side of the cake a predetermined amount to remove material deposited thereon from the liquid.

10. A continuous filtering process consisting of continuously building up a filter cake within an enclosed chamber and continuously moving the same bodily over a permanent filter medium between such wall and the filter liquid while such cake is directly in contact with the wall, and continuously compressing the filter cake after it leaves the filter wall.

11. A continuous filtering process consisting of continuously building up a filter cake within an enclosed chamber and continuously moving the same over a permanent filter wall between such wall and the filter liquid while such cake is directly in contact with the wall, the filter cake forming a continuously moving body of solids through which the liquid passes to the filter wall, continuously compressing the filter cake to remove the filter liquid therefrom after it leaves the filter wall, and continuously passing the compressed cake therefrom into a second chamber and washing the same therein.

12. A continuous filtering process consisting of forcing a filter liquid in one direction under pressure through an enclosed chamber, continuously building up a filter cake near the liquid exit portion of the chamber and continuously moving the same along a permanent filter wall between such wall and the filter liquid while such cake is directly in contact with the wall, the filter cake forming a continuously moving body of solids through which the liquid passes to the filter wall, and continuously moving the filter cake off the filter wall and through the remaining portion of the chamber in contact with and in a direction counter to the filter liquid.

13. A continuous filtering process consisting of forcing a filter liquid in one direction under pressure through an enclosed chamber, continuously building up a filter cake near the liquid exit portion of the chamber and continuously moving the same along a permanent filter wall between such wall and the filter liquid while such cake is directly in contact with the wall, the filter cake forming a continuously moving body of solids through which the liquid passes to the filter wall, continuously moving the filter cake off the filter wall and through the remaining portion of the chamber in contact with and in a direction counter to the movement of the filter liquid, and continuously compressing the filter cake at the end of the chamber.

14. A continuous filtering process consisting of forcing a filter liquid in one direction under pressure through an enclosed chamber, continuously building up a filter cake near the liquid exit portion of the chamber and continuously moving the same along a permanent filter wall between such wall and the filter liquid while such cake is directly in contact with the wall, the filter cake forming a continuously moving body of solids through which the liquid passes to the filter wall, continuously moving the filter cake off the filter wall and through the remaining portion of the chamber in contact with and in a direction counter to the movement of the filter liquid, continuously compressing the filter cake at the end of the chamber, and thereafter continuously passing the cake into a second chamber and washing the same therein.

15. A continuous or semi-continuous filtering process consisting of building up a filter cake between two filter walls within an enclosed chamber, passing the liquid to be clarified or treated through both of the said walls and filter cake, and building up fresh filter cake and moving the same thereinto to take the place of and simultaneously with the movement of the first filter cake therethrough.

16. A continuous filtering process consisting of continuously providing filter cake to and continuously moving the same between two filter walls within an enclosed chamber, and passing the liquid to be clarified or treated through both of the said walls and filter cake.

17. A continuous filtering process consisting of continuously providing filter cake to and continuously moving the same between two filter walls adjacent to a chamber containing a liquid to be treated, and passing the liquid through both of the said walls and filter cake.

18. A continuous treating and filtering process consisting of forcing a liquid under pressure into an enclosed chamber adjacent one end thereof and through the chamber toward the other end, providing treating solids in the chamber near a filter wall adjacent the said other end, and moving such solids over and in contact with the filter wall through the chamber in a direction counter to the filter liquid movement while building up a filter cake over the said filter wall, and filtering the liquid through such cake and filter wall to the exterior of the chamber.

19. In combination, an enclosed chamber, a filter wall cooperating therewith, means for supplying treating solids to the chamber, means for forming the solids into a filter cake and moving the same bodily over and in contact with the filter wall and between such wall and the filter liquid in the chamber, and means engaging and shearing the liquid side of the cake for maintaining the cake at a constant thickness.

20. In combination, an enclosed chamber, a filter wall cooperating therewith, means for supplying treating solids to the chamber, continuously moving means for continuously forming the solids into a filter cake and continuously moving the same bodily over and in contact with the filter wall and between such wall and the filter liquid in the chamber, and means engaging and shearing the liquid side of the cake for maintaining the cake at a constant thickness.

21. In combination, an enclosed chamber, a filter wall cooperating therewith, means for supplying treating solids to the chamber, continuously moving means adjacent but out of contact with the filter wall for continuously and bodily moving the solids in the form of a filter cake over and in contact with the filter wall between such wall and the filter liquid in the chamber, and means engaging and shearing the liquid side of the cake for maintaining the cake at a constant thickness.

22. In combination, an enclosed chamber, means for supplying treating solids to the chamber, means including a filter wall at one end of chamber for separating liquid from the solids and discharging the separated liquid outside of chamber, and means including a filter wall at other end of chamber for compressing the solids and separating the remaining liquid therefrom and discharging the resulting separated solids outside of the chamber.

23. In combination, an enclosed chamber, a filter wall cooperating therewith, means for supplying treating solids to the chamber, means including a plurality of substantially horizontal supporting elements for receiving and forming the solids into a filter cake and moving the same bodily over and in contact with the filter wall between such wall and the filter liquid in the chamber, and means engaging and shearing the liquid side of the cake for maintaining the cake at a constant thickness.

24. In combination, an enclosed chamber, a filter wall cooperating therewith, means for supplying treating solids to the chamber, and means for forming the solids into a filter cake, moving the same bodily over the filter wall and between such wall and the filter liquid in the chamber, and means within the chamber for agitating the liquid with fresh treating solids and cooperating with the liquid side of the filter cake to prevent the building up of solids thereon beyond a predetermined thickness.

25. In combination, an enclosed chamber, a filter wall cooperating therewith, means for supplying treating solids to the chamber, means including a spirally arranged member adjacent the wall for receiving and forming the solids into a filter cake and moving the same bodily over the filter wall between such wall and the filter liquid in the chamber, and spirally arranged means within the chamber for agitating the liquid with fresh treating solids and cooperating with the liquid side of the filter cake to prevent the building up of solids thereon beyond a predetermined thickness.

26. In combination, an enclosed cylindrical chamber, a filter wall within the chamber, means for supplying treating solids to the chamber, a spirally arranged member adjacent the inner side of the wall for receiving and forming the solids into a filter cake and moving the same bodily over and in contact with the filter wall and between such wall and the filter liquid in the chamber, and means engaging and shearing the liquid side of the cake for maintaining the cake at a constant thickness.

27. In combination, an enclosed cylindrical chamber, a filter wall adjacent the periphery thereof, means for supplying treating solids to the chamber, and a spirally arranged member adjacent the inner side of the wall for receiving and forming the solids into a filter cake, moving the same over the filter wall lengthwise of the chamber and between such wall and the filter liquid in the chamber, and a spirally arranged member extending axially in the chamber and adapted to agitate the liquid with fresh treating solids and cooperate with the liquid side of the filter cake to keep the same from building up beyond a predetermined thickness.

28. A continuous filtering apparatus comprising the combination of an enclosed chamber, a spiral filter-cake feeding member therein, and a filter liquid agitating member adjacent and co-axial with the feeding member.

29. A continuous filtering apparatus comprising the combination of an enclosed chamber, a rotating agitating member therein and a spiral filter-cake feeding member surrounding the agitating member.

30. A continuous filtering apparatus comprising the combination of an enclosed chamber having a filter portion and a counter-current portion, a filter cake feeding member in the filter portion, and a spiral member in the counter-current portion, both members being adapted to move treating solids through the chamber.

31. A continuous filtering apparatus comprising the combination of an enclosed chamber having a filter portion and a counter-current portion, a filter cake feeding member in the filter portion, and a rotary carrying screw co-axial therewith in the counter-current portion for moving treating solids therethrough.

32. A continuous filtering apparatus comprising the combination of an enclosed chamber having a filter portion, a counter-current portion and a compressing portion, a filter cake feeding member in the filter portion, a spiral member in the counter-current portion adapted to move treating solids through a liquid therein, and a screw in the compressing portion for compressing the said solids therein.

33. A continuous filtering apparatus comprising the combination of an enclosed chamber having a filter portion and a collecting portion, a filter wall in the filter portion, a filter cake feeding member and cooperating means for maintaining the filter cake fed thereby at a constant thickness on the filter wall, and a screw in the collecting portion for passing the filter cake solids out of the chamber.

34. A continuous filtering apparatus comprising the combination of an enclosed chamber having a filter portion and a compressing portion, a filter wall in the filter portion, a filter cake feeding member and cooperating means for maintaining the filter cake fed thereby at a constant thickness on the filter wall, and a screw in the compressing portion for compressing the filter cake solids discharged by the feeding member.

35. A continuous filtering apparatus comprising the combination of an enclosed chamber having a filter portion, a counter-current portion and a compressing portion, a feeding member in the filter portion, a counter-current screw in the counter-current portion, and a compressing screw in the compressing portion, said screws being coaxial, and means outside the chamber for rotating the screws.

36. In combination, an enclosed chamber, a filter wall cooperating therewith and adapted to separate solids from a liquid within the chamber, continuously moving means adjacent but out of contact with the filter wall for continuously moving the solids bodily over and in contact with the filter wall between such wall and the filter liquid in the chamber, and means for further compacting the separated solids and ejecting them from the chamber.

FRED W. MANNING.